United States Patent [19]
Fohrmann

[11] 3,886,866
[45] June 3, 1975

[54] CAPACITOR - CONTACT FUZE SYSTEM

[75] Inventor: Ernest F. Fohrmann, Silver Spring, Md.

[73] Assignee: The United States of America as represented by the Secretary of the Navy, Washington, D.C.

[22] Filed: Nov. 24, 1972

[21] Appl. No.: 310,528

[52] U.S. Cl. .................... 102/70.2 R; 317/80
[51] Int. Cl. ............................ F42c 11/00
[58] Field of Search .............. 317/246–249; 102/70.2 R, 70.2 G, 78, 70.2, 78

[56] References Cited
UNITED STATES PATENTS

| 2,417,452 | 3/1957 | Stiefel | 171/97 |
| 2,490,733 | 12/1949 | Kennedy | 171/97 |
| 3,054,352 | 9/1962 | Perdrequx, Jr. et al. | 102/70.2 G |
| 3,653,038 | 3/1972 | Webb et al. | 317/249 R |
| 3,659,163 | 4/1972 | Borisov et al. | 317/249 R |
| 3,721,860 | 3/1973 | Phinney | 317/80 |

Primary Examiner—Samuel Feinberg
Assistant Examiner—Charles T. Jordan
Attorney, Agent, or Firm—R. S. Sciascia; P. Schneider; R. Rothman

[57] ABSTRACT

A contact fuzing system having an acceleration-responsive variable capacitor for initiating detonation. The capacitor is connected in parallel with a detonator and an electrical switch. One plate of the capacitor is resiliently mounted and arranged to separate from the other plate as the fuzing system decelerates. Upon separation, the voltage across the capacitor increases thereby triggering the switch and firing the detonator.

10 Claims, 3 Drawing Figures

CAPACITOR - CONTACT FUZE SYSTEM

BACKGROUND OF THE INVENTION

The present invention relates generally to an electronic firing circuit and more particularly to a contact-fuzing system for use in an explosive device.

Among other contact-fuzing systems the most widely used type is a system in which a piezoelectric transducer (accelerometer) produces an electrical impulse which, after electronic circuit conditioning, is used to trigger an electronic circuit. A firing capacitor within the circuit discharges, activating a detonator. The transducer produces an output voltage when applied mechanical forces cause an inertial mass to press against the piezoelectric crystal.

Such a device presents a major problem. If forces are applied to it at or near the natural frequency of vibration of its spring-mass system, it will deliver an amplified output signal. Suppression of this resonance phenomenon requires the use of an electronic low-pass filter. Such a filter is usually designed for cut-off at a frequency which represents a good compromise between the requirement to damp the resonance effect and the requirement for adequate sensitivity to the fastest-rising impact signals expected.

SUMMARY OF THE INVENTION

The capacitor-contact fuzing system of the present invention is a combination of an accelerometer and an electronic firing switch in which the firing capacitor, serving as a so-called accelerometer, operates essentially in response to a decelerating force, such as occurs upon contact with an object, with little regard to the duration of its application or the resulting effect on the vehicle carrying the device. By employing a single component as both an accelerometer and a firing capacitor, the invention eliminates the need for an electronic low-pass filter so necessary in previous devices.

It is well known that the capacitance $C$ of a capacitor is equal to the ratio of the electric charge $Q$ on the capacitor over the voltage or electrical potential $V$ between the capacitor's plates or $C = Q/V$ (1). It is also well known that the electrical potential $V$ across a capacitor is given by the equation $V = QDK/K_1A$ (2), where $D$ is the distance between oppositely charged surfaces or capacitor plates, $A$ is the effective surface area of one capacitor plate, $K_1$ is a dielectric constant, and $K$ is a numerical constant dependent upon the system of units used. Effective surface area may be defined as the projected area of one capacitor plate upon the other. It should further be noted that the above equations apply equally as well to capacitors formed by concentric cylinders and the term plates as used herein is meant to include both parallel-plate capacitors and concentric-cylinder capacitors. It is clear from equation (2) that separation of the plates of a capacitor, after the capacitor has been charged to a given potential, will result in a variation in potential which is inversely proportional to the variation in capacitance, since $Q$, the charge on the capacitor, will remain essentially constant. The present invention employs this phenomenon or in the alternative a variation in the effective area A of a capacitor in a firing circuit to provide increased voltage thereby closing an electronic switch and firing a detonator or other device.

OBJECTS OF THE INVENTION

An object of the present invention is to eliminate the need for a separate accelerometer, such as a piezoelectric transducer, or inertia device.

Another object is to eliminate the need for filters and matching circuits ahead of the trigger circuits employed in contact-fuzing systems.

A further object of the invention is to reduce the number of electronic components normally used in a contact-fuzing system to a minimum.

Other objects, advantages, and novel features of the present invention will become apparent from the following detailed descriptions of the invention when considered in conjunction with the accompanying drawings.

DESCRIPTION OF THE PREFERRED EMBODIMENTS

Figure 1:
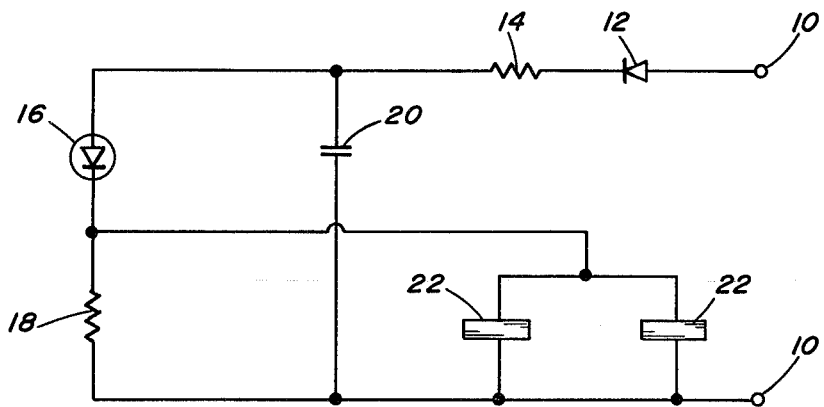
FIG. 1 is a schematic diagram illustrating the electrical circuit of the present invention.

FIG. 1, which illustrates a preferred embodiment of the firing circuit, shows a firing capacitor 20 connected in parallel with an electronic switch 16 and detonators 22, the detonators and switch forming a series combination. Resistor 14 is used to regulate the amount of current to be drawn from a supply (not shown) which may be attached to terminals 10 to initially charge the firing capacitor 20. The diode 12 prevents the discharge of the firing capacitor 20 in case the supply should be interrupted. Resistor 18 is of sufficient magnitude so that the current does not bypass the detonators 22.

Figure 2:
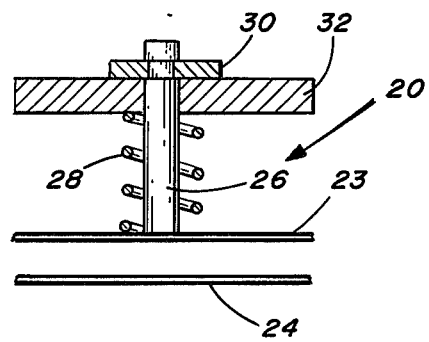
FIGS. 2 and 3 illustrate in more detail two possible embodiments of the firing capacitor.
Figure 3:
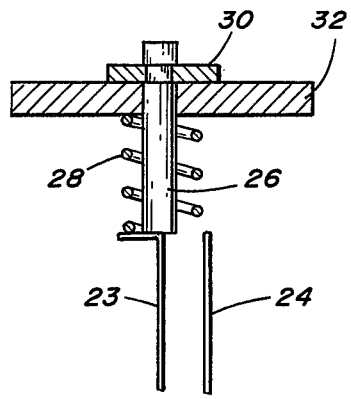

FIG. 2 and FIG. 3 in which like numerals indicate like elements illustrate two possible embodiments of the firing capacitor 20. In FIG. 2 plate 24 of the capacitor is fixed, and plate 23 is movably mounted. Plate 23 is connected to pin 26 which is mounted in a retaining wall 32 and held there by spider 30 and the force of spring 28 against plate 23. As can be seen in FIG. 2, plates 23 and 24 upon deceleration of the device will, when oriented in a proper manner, spread apart increasing $D$, the distance between the plates, in equation (2) above. It can be seen that deceleration of the device in which such a circuit is mounted would increase the voltage $V$ across the capacitor 20 and thus across the electronic switch 16. The same result would occur in the embodiment illustrated in FIG. 3. However, instead of moving away from plate 24, plate 23 will move to one side, parallel to plate 24, thereby decreasing the effective area A in equation (2) above.

In operation the capacitor 20 is charged to a potential of preferably one-half of that required for triggering the electronic switch 16. As the physical configuration of the capacitor changes and the potential across the triggering switch 16 rises to the required value, the impedance of the switch changes from a very high value to a very low value, i.e. open circuit to a closed circuit, thus permitting the stored electrical charge on capacitor 20 to flow into the detonators 22 and initiate a sequence of explosive events.

The physical construction of the capacitor 20 is dictated by the specific requirements of the contact-fuze application. Essentially it will consist of a stationary plate and a movable one, which under the influence of a decelerating force moves away from the stationary plate. The movement may be perpendicular or parallel to the stationary plate, whichever is desired or dictated by space restraints. The dielectric medium can be either air or a material having a high dielectric constant. Moreover, the number of plates, their physical arrangements, for example parallel plates or concentric cylinders or any other configurations are primarily dictated by the capacitance required for the particular application.

The electronic trigger switch 16 generally consists of a four layer diode of the Shockley type. Other types of electronic switches can be used but require more complex circuitry. The circuit illustrated and described is a basic one, and any refinements will be governed by its use in conjunction with other types of devices. The movement of the firing capacitor can be controlled by a spring as shown, which permits relative displacement of the capacitor elements only when a certain level of deceleration force is experienced. This feature is essential so that undesirable vibratory forces do not actuate the device.

Obviously many modifications and variations of the present invention are possible in light of the above teachings. For example, the circuit might be employed in a moving vehicle to activate safety devices upon sudden deceleration as, for example, upon impact. It is therefore to be understood that, within the scope of the appended claims, the invention may be practiced otherwise than as specifically described.

What is claimed is:

1. A capacitor-contact fuzing system for use in an explosive device, comprising:
   a capacitor;
   a detonator connected to said capacitor;
   an electronic switch connected to said capacitor and said detonator for enabling the firing of said detonator when the voltage across said capacitor increases to a predetermined magnitude and
   means connected to said capacitor for decreasing the capacitance thereof in response to deceleration of said explosive device whereby said decrease in capacitance increases the voltage across said capacitor.

2. The capacitor-contact fuzing system of claim 1 wherein said means includes means for increasing the distance between plates of the capacitor.

3. The capacitor-contact fuzing system of claim 2 wherein said last mentioned means includes resilient means connected to at least one of said plates of said capacitor for biasing one plate to a predetermined position and permitting relative displacement of said one plate from another plate in response to a predetermined decelerating force.

4. The capacitor-contact fuzing system of claim 1 wherein said means includes means for decreasing the effective area of interaction of the plates of the capacitor.

5. The capacitor-contact fuzing system of claim 4 wherein said last mentioned means includes resilient means connected to at least one of said plates of said capacitor for biasing one plate to a predetermined position and permitting relative displacement of said one plate from another plate at a predetermined decelerating force.

6. The capacitor-contact fuzing system of claim 1 wherein the deceleration of said explosive device occurs upon contact with an object.

7. An electronic firing circuit comprising:
   a firing capacitor;
   a device to be activated by said firing capacitor;
   an electronic switch connected in a series circuit with said device, said firing capacitor being connected in parallel with said series circuit; and
   means to decrease the capacitance of said capacitor while maintaining the charge on said capacitor constant and thereby increase the voltage across said capacitor.

8. The electronic firing circuit of claim 7 wherein said capacitor has at least two plates and said means includes resilient means for biasing at least one plate of the capacitor into a predetermined position and permitting relative displacement of said one plate relative to another plate when a force of a predetermined magnitude acts on said one plate.

9. The electronic firing circuit of claim 8 wherein said predetermined force is a deceleration force which occurs upon contact with an object.

10. A capacitor-contact fuzing system for use in an explosive device, comprising:
    a capacitor;
    a detonator connected to said capacitor;
    an electronic switch connected to said capacitor and said detonator for permitting firing of said detonator when the voltage across said capacitor increases to a predetermined magnitude; and
    means connected to said capacitor for decreasing the capacitance thereof in response to acceleration of said explosive device whereby said decrease in capacitance increases the voltage across said capacitor.

* * * * *